(12) United States Patent
Wang et al.

(10) Patent No.: US 10,259,910 B2
(45) Date of Patent: Apr. 16, 2019

(54) MOISTURE CURABLE SILICONE COMPOSITION

(71) Applicants: 3M INNOVATIVE PROPERTIES COMPANY, St. Paul, MN (US); Yaming Wang, Shanghai (CN)

(72) Inventors: Yaming Wang, Shanghai (CN); Wenyan Li, Shanghai (CN); Quancai Miao, Shanghai (CN); Zhou Jin, Shanghai (CN); Hong Lu, Shanghai (CN)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 0 days.

(21) Appl. No.: 15/542,102

(22) PCT Filed: Jan. 8, 2015

(86) PCT No.: PCT/CN2015/070344
§ 371 (c)(1),
(2) Date: Jul. 7, 2017

(87) PCT Pub. No.: WO2016/109961
PCT Pub. Date: Jul. 14, 2016

(65) Prior Publication Data
US 2018/0273688 A1 Sep. 27, 2018

(51) Int. Cl.
*C08L 15/02* (2006.01)
*C08G 77/16* (2006.01)
(Continued)

(52) U.S. Cl.
CPC ............. *C08G 77/16* (2013.01); *C08G 77/18* (2013.01); *C08J 5/18* (2013.01); *C08K 3/013* (2018.01);
(Continued)

(58) Field of Classification Search
None
See application file for complete search history.

(56) References Cited

U.S. PATENT DOCUMENTS

| | | | |
|---|---|---|---|
| 3,545,773 A | 12/1970 | Smith | |
| 4,252,391 A * | 2/1981 | Sado | B29C 47/0004 174/69 |

(Continued)

FOREIGN PATENT DOCUMENTS

| | | |
|---|---|---|
| EP | 1981140 | 10/2008 |
| FR | 2 393 831 A1 | 1/1979 |

(Continued)

OTHER PUBLICATIONS

International Search Report for PCT International Application No. PCT/CN2015/070344, dated Oct. 9, 2015, 6pgs.

(Continued)

*Primary Examiner* — Robert S Loewe
(74) *Attorney, Agent, or Firm* — Janet A. Kling

(57) ABSTRACT

Disclosed is a moisture curable composition comprising a reactive or curable silicone; a crosslinker; an unreactive silicone; and at least of an initial strength-imparting agent and a plasticizer. The composition can have superior waterproofing property and weatherproofing property and allows easy installation on a substrate and easy peeling from the substrate.

17 Claims, 3 Drawing Sheets

(51) Int. Cl.
*C09J 121/00* (2006.01)
*C08L 83/04* (2006.01)
*C08G 77/18* (2006.01)
*C08K 5/00* (2006.01)
*C08L 9/00* (2006.01)
*C08L 15/00* (2006.01)
*C08L 83/00* (2006.01)
*C08K 3/013* (2018.01)
*C08J 5/18* (2006.01)
*C08K 3/04* (2006.01)
*C08K 3/08* (2006.01)
*C08K 3/22* (2006.01)
*C08K 3/26* (2006.01)
*C08K 3/36* (2006.01)
*C08K 5/01* (2006.01)
*C08K 5/5415* (2006.01)
*C08L 9/06* (2006.01)
*C08L 23/12* (2006.01)

(52) U.S. Cl.
CPC .............. *C08K 3/04* (2013.01); *C08K 3/08* (2013.01); *C08K 3/22* (2013.01); *C08K 3/26* (2013.01); *C08K 3/36* (2013.01); *C08K 5/0016* (2013.01); *C08K 5/0025* (2013.01); *C08K 5/01* (2013.01); *C08K 5/5415* (2013.01); *C08L 9/00* (2013.01); *C08L 9/06* (2013.01); *C08L 15/00* (2013.01); *C08L 15/005* (2013.01); *C08L 15/02* (2013.01); *C08L 23/12* (2013.01); *C08L 83/00* (2013.01); *C08L 83/04* (2013.01); *C09J 121/00* (2013.01); *C08K 2003/0881* (2013.01); *C08K 2003/2224* (2013.01); *C08K 2003/2227* (2013.01); *C08K 2003/2251* (2013.01); *C08K 2003/2268* (2013.01); *C08K 2003/2272* (2013.01); *C08K 2003/265* (2013.01); *C08K 2003/267* (2013.01); *C08L 2203/20* (2013.01); *C08L 2312/00* (2013.01)

(56) References Cited

U.S. PATENT DOCUMENTS

| | | | |
|---|---|---|---|
| 4,874,331 A | 10/1989 | Iverson | |
| 5,403,977 A | 4/1995 | Steptoe et al. | |
| 5,569,750 A | 10/1996 | Knepper et al. | |
| 5,744,703 A * | 4/1998 | Krenceski | G01N 19/04 |
| | | | 73/54.01 |
| 5,816,853 A | 10/1998 | Buekers et al. | |
| 5,849,832 A * | 12/1998 | Virnelson | C03C 27/10 |
| | | | 524/512 |
| 5,969,057 A * | 10/1999 | Schoeley | C08L 83/04 |
| | | | 525/474 |
| 6,153,691 A * | 11/2000 | Gornowicz | C08L 23/06 |
| | | | 524/861 |
| 6,234,683 B1 | 5/2001 | Waldron et al. | |
| 6,235,832 B1 * | 5/2001 | Deng | C08L 83/04 |
| | | | 524/492 |
| 6,262,161 B1 * | 7/2001 | Betso | B32B 27/28 |
| | | | 524/425 |
| 6,355,317 B1 | 3/2002 | Reid et al. | |
| 6,465,107 B1 * | 10/2002 | Kelly | C08F 255/00 |
| | | | 156/329 |
| 6,471,820 B1 | 10/2002 | Paulick | |
| 6,548,763 B2 | 4/2003 | Kaltenborn et al. | |
| 6,864,427 B2 | 3/2005 | Radelet et al. | |
| 6,926,449 B1 | 8/2005 | Keenum et al. | |
| 6,948,976 B2 | 9/2005 | Goodwin et al. | |
| 6,955,558 B1 | 10/2005 | Low et al. | |
| 7,481,585 B2 | 1/2009 | Scadden et al. | |
| 7,553,901 B2 | 6/2009 | Horikoshi et al. | |
| 7,568,934 B1 | 8/2009 | Williams et al. | |
| 7,605,203 B2 | 10/2009 | Feng et al. | |
| 7,625,976 B2 | 12/2009 | Landon et al. | |
| 7,677,814 B2 | 3/2010 | Lu et al. | |
| 8,723,034 B2 | 5/2014 | Xiao et al. | |
| 2002/0191941 A1 | 12/2002 | Milanowski et al. | |
| 2005/0192387 A1 * | 9/2005 | Williams | C08K 5/57 |
| | | | 524/261 |
| 2007/0116907 A1 * | 5/2007 | Landon | C03C 27/10 |
| | | | 428/34 |
| 2007/0173624 A1 | 7/2007 | Chaussade et al. | |
| 2007/0244249 A1 * | 10/2007 | Correia | C08L 83/04 |
| | | | 524/588 |
| 2008/0193755 A1 * | 8/2008 | Guise | B29C 47/0016 |
| | | | 428/379 |
| 2010/0098888 A1 | 4/2010 | Landon et al. | |
| 2011/0075971 A1 | 3/2011 | Elenbaas et al. | |
| 2012/0322942 A1 * | 12/2012 | Berghmans | C08L 83/04 |
| | | | 524/783 |
| 2014/0041893 A1 * | 2/2014 | Adams | C08F 299/02 |
| | | | 174/50.62 |
| 2014/0314381 A1 * | 10/2014 | Adams | C08L 83/04 |
| | | | 385/100 |
| 2016/0289416 A1 | 10/2016 | Guichard et al. | |
| 2016/0347914 A1 * | 12/2016 | Overdulve | C08J 9/32 |

FOREIGN PATENT DOCUMENTS

| | | | |
|---|---|---|---|
| GB | 2 424 898 A | 10/2006 | |
| KR | 2014-0000294 | 1/2014 | |
| SU | 525731 A1 | 8/1976 | |
| SU | 595346 A1 | 2/1978 | |
| SU | 1726490 A1 | 4/1992 | |
| WO | WO 2012-038854 | 3/2012 | |
| WO | WO-2013174708 A1 * | 11/2013 | ............. C08L 83/04 |
| WO | WO 2015-157914 | 10/2015 | |

OTHER PUBLICATIONS

Search Report for RU Appl. No. 2017121351, dated Jul. 13, 2018, 2 pp.
Supplementary European Search Report for EP Appl. No. 15876469.6, dated Sep. 6, 2018, 4 pp.

\* cited by examiner (a)            (b)

(a)          (b)

MOISTURE CURABLE SILICONE COMPOSITION

TECHNICAL FIELD

The invention relates to a moisture curable composition, an article produced from the composition, a device comprising the composition or the article which has been subjected to the curing and a method of using the article.

BACKGROUND ART

In the telecommunication electric or electronic industry, electrical connectors have been widely used to connect coaxial cables to equipments and other cables. The electrical connectors are generally made from stainless steel and the cables generally have an external polyvinylchloride (PVC) or polyethylene (PE) layer. These electrical connectors and cables, which constitute connector/cable assemblies as shown in FIG. 1, are generally exposed to the outside environment. Therefore, these assemblies are required to be subjected to the sealing treatment in order to prevent electrical degradation caused by water and other contaminants or weather factors.

In order to solve the above problem, a sealing technology in which a shrink tube having an uncurable glue inside is installed onto a surface of the electrical connector has been developed. However, this sealing technology is disadvantageous in that the uncurable glue has insufficient strength and is easily aged, it may be difficult to install the shrink tube onto a surface of the electrical connector, and it may be also difficult to remove the shrink tube for periodic inspection or maintenance. Another conventional sealing technology involves installing a sealing box having silicon gel inside onto a surface of the electrical connector. However, this sealing technology has disadvantages of easy water penetration and difficult installation and inspection or maintenance.

Further, a conventional sealing technology involves wrapping multiple alternating layers of the tape and the composition to the assembly. However, this technology is a time-consuming and cumbersome to operate and the effectiveness is dependent on the skill of a technician. Additionally, it is difficult to install these materials at a high level or the top of tower, which ultimately affects the safety of the technician.

Therefore, there is a need to develop a new solution or product which can provide sufficient waterproofing and weatherproofing property and enables easy installation and inspection or maintenance.

SUMMARY OF THE INVENTION

The invention has been made in order to solve or alleviate one or more of the problems of the prior art.

In one aspect of the invention, a moisture curable composition is provided, comprising: a reactive or curable silicone; a crosslinker; an unreactive silicone; and at least of an initial strength-imparting agent and a plasticizer.

In another aspect of the invention, an article produced from the above composition is provided.

In yet another aspect of the invention, a device comprising the above composition or the above article which has been subjected to the curing is provided.

In yet still another aspect of the invention, a method of using the above article is provided, comprising a step of applying the article onto a surface of a connector/cable assembly and a step of curing the article by exposing it to moisture.

DESCRIPTION OF THE DRAWINGS

The embodiments of the invention will be described with reference to the accompanying drawings which are intended to be only exemplary, not limiting, wherein.

DETAILED DESCRIPTION OF THE INVENTION

Figure 1:
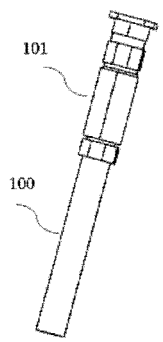
FIG. 1 shows a schematic view of a connector/cable assembly.

The moisture curable composition according to embodiments of the invention comprises a reactive or curable silicone; a crosslinker; an unreactive silicone; and at least of an initial strength-imparting agent and a plasticizer.

According to embodiments of the invention, a moisture curable composition which can have superior waterproofing property and weatherproofing property (aging resistance and heat resistance) and allow easy installation on a substrate such as connector/cable assembly and easy peel from such substrate can be provided. Further, the moisture curable composition according to embodiments of the invention may further have superior vibration resistance and installation performance. In addition, the moisture curable composition according to certain embodiments may further have superior fire retardance.

The term "moisture curable" as used herein means that the composition can carry out the curing or crosslinking reaction upon its exposure to moisture existed in atmosphere.

Hereinafter, each component in the composition will be described in detail.

Reactive or Curable Silicone

The reactive or curable silicone is a reactive component of the composition. The reactive or curable silicone works as backbone after the composition is cured, and can provide the composition with necessary mechanical strength, bonding strength, aging resistance and other functional performance after curing.

According to embodiments of the invention, the reactive or curable silicone contains active groups such as hydroxyl group and/or alkoxyl group and can therefore carry out the curing or crosslinking reaction with the crosslinker upon exposure to moisture.

The reactive or curable silicone may comprise at least one selected from the group comprising a hydroxyl-containing silicone, an alkoxyl-containing silicone, and the combination thereof, and preferably a hydroxyl-containing silicone.

The hydroxyl-containing silicone may comprise a silicone as represented by the following formula (I)

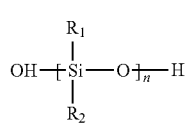

(I)

wherein $R_1$ and $R_2$ are independently selected from the group consisting of H, substituted or unsubstituted C1-12 alkyl, C2-12 alkenyl, C2-12 alkynyl, C1-12 alkoxyl, and C6-12 aryl; and n is an integer of from 1,000 to 3,000,000, preferably from 100,000 to 2,000,000, more preferably from 500,000 to 2,000,000.

The examples of the hydroxyl-containing silicone may comprise a hydroxy-containing polydimethylsiloxane. The hydroxyl-containing silicone may be commercially available and the examples thereof may comprise 107 series silicone rubbers available from Dow Corning, or similar materials available from Wacker Chemie AG, Momentive, Shin-Etsu Chemical, BlueStar, or Jiangsu Hongda Company.

The alkoxyl-containing silicone may comprises a moiety of formula (II)

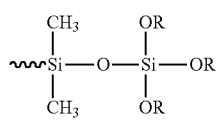

(II)

wherein each R is independently selected from the group consisting of substituted or unsubstituted C1-12 alkyl, particularly C1-10 alkyl, more particularly C1-6 alkyl, even more particularly methyl or ethyl.

The examples of the alkoxyl-containing silicone may comprise a methoxy-containing silicone, an ethoxy-containing silicone, and the combination thereof.

The reactive or curable silicone may have a number-average molecular weight (Mn) of from 10,000 to 3,000,000, preferably from 100,000 to 2,000,000, and more preferably from 500,000 to 2,000,000. The reactive or curable silicone is preferably selected to exhibit a high viscosity. The reactive or curable silicone has generally a viscosity of 10,000 cps or more, preferably from 10,000 cps to 2,000,000 cps, more preferably from 100,000 cps to 1,500,000 cps, and even more preferably from 300,000 cps to 1,000,000 cps. For example, a hydroxy-containing polydimethylsiloxane with a viscosity of 500,000 cps may be exemplified.

According to certain embodiments of the invention, when the content of the reactive or curable silicone in the composition is too high, the composition before curing may be very soft or tacky, which may possibly affect the installation performance of the composition, and when the content of the reactive or curable silicone in the composition is too low, the strength of the composition after curing may be possibly impaired.

According to certain embodiments of the invention, the content of the reactive or curable silicone may be generally in the range of 5%-40% by weight, preferably 7%-27% by weight and more preferably 9%-25%, based on the total weight of the composition.

Crosslinker

The crosslinker can react with the reactive or curable silicone upon exposure to moisture. Specifically, the crosslinker can be hydrolyzed in the presence of moisture and then react with the reactive or curable silicone.

The crosslinker may comprise at least one selected from the group including an alkoxy functional curing agent, an acetoxy functional curing agent, an oximino functional curing agent, a keto functional curing agent, and the combination thereof. Preferably, the crosslinker comprises at least one selected from the group including methyltriacetoxysilane, methyltrimethoxysilane, methyl tri(isopropenyloxy)silane, methyltrimethylethylketoximesilane, vinyltrimethoxysilane, vinyltriethoxysilane, γ-(methacryloxy)propyltrimethoxysilane, aminopropyltriethoxysilane, N-(β-aminoethyl)-γ-aminopropyltrimethoxysilane, γ-(2,3-epoxypropoxy)propyltrimethoxysilane, γ-mercaptopropyltriethoxysilane, γ-mercaptopropyltrimethoxysilane, methyltriethoxysilane, tetramethoxysilane, tetrapropoxysilane, tetraethoxysilane, and ethyltriacetoxysilane.

More preferably, the crosslinker comprises at least one alkoxy silane, such as methyltrimethoxysilane and methyltriethoxysilane. The alkoxy silane crosslinkers advantageously allow for a moderate crosslinking rate of the composition which on one hand allows the composition to be cured in a short time, and on the other hand, is not too quick for the composition to be applied by an operator.

The crosslinker may be commercially available and the examples thereof may include D20 available from Hubei Xinlantian Industry Co., Ltd, China.

According to certain embodiments of the invention, the crosslinker may be added into the composition in an amount of from 0.1% to 25% by weight, preferably from 0.8% to 15% by weight, more preferably from 2% to 10% by weight, based on the amount of the reactive or curable silicone.

Unreactive Silicone

The unreactive silicone in the composition is relative to the reactive or curable silicone and does not contain any active function group capable of participating in the curing or corsslinking reaction.

The unreactive silicone may comprise at least one selected from the group including a high molecular weight solid silicone rubber (SSR) and a low molecular weight silicone oil. The high molecular weight solid silicone rubber or low molecular weight silicone oil may comprise at least one selected from the group including polydimethylsiloxane silicone rubber or oil, polymethylvinylsilicone rubber or oil, and polymethylphenylsilicone rubber or oil and the combination thereof. The molecular weight Mn of the SSR may be from 100,000 to 1,000,000, and preferably from 200,000 to 800,000. The viscosity of the silicone oil may be from 0.65 cps to 1,000,000 cps, and preferably from 50 cps to 800,000 cps.

The unreactive silicone may be commercially available and the examples thereof may comprise DC200-50 available from Dow Corning.

The unreactive silicone allows the tailoring of the cohesive strength and the adhesive strength to the resulting composition and finally helps to adjust the peel strength of the resulting composition. At the same time, the unreactive silicone helps to improve the installation performance of the resulting composition. According to certain embodiments of the invention, the ability of removing the cured composition from a surface of the connector/cable assembly may be possibly impaired when the content of the unreactive silicone in the composition is too low, and the strength of the cured composition may be possibly impaired when the content of the unreactive silicone in the composition is too high.

According to certain embodiments of the invention, the content of the unreactive silicone may be generally in the range of 1%-35% by weight and preferably 3%-20% by weight, based on the total weight of the composition.

According to certain embodiments of the invention, the ratio of the reactive or curable silicone to the unreactive silicone may be generally in the range of 1:10 to 40:1 by weight, preferably 5:10 to 30:1 by weight and more preferably 5:10 to 10:1 by weight.

Initial Strength-Imparting Agent

The initial strength-imparting agent can impart the initial strength to the composition before curing. As the initial strength-imparting agent is well dispersed throughout the composition, a uniform interpenetrating polymer network may be formed upon curing or crosslinking of the composition. It is also possible the initial strength-imparting agent is dispersed into the crosslinked silicone network with continuous linear structure.

In addition, the initial strength-imparting agent does not deteriorate the adhesive strength of the composition to a surface of substrates or structures such as those made by metals. Preferably, the initial strength-imparting agent is heat-resistant and aging-resistant.

The initial strength-imparting agent may comprise at least one uncrosslinked or partially crosslinked rubber and/or elastomer.

The term "uncrosslinked or partially crosslinked rubber and/or elastomer" as used herein refers to a rubber and/or elastomer which is not crosslinked, or which is partially crosslinked, preferably having a degree of crosslinking of not more than 50 weight %, more preferably having a degree of crosslinking of not more than 30 weight %, and most preferably having a degree of crosslinking of not more than 10 weight %.

The rubber and/or elastomer may have a Mooney viscosity (ML1+4) of at least 10 at 100° C., preferably in the range of 20 to 200 at 100° C., preferably in the range of 40 to 150 at 100° C., and more preferably in the range of 50 to 100 at 100° C. For example, the rubber and/or elastomer may have a Mooney viscosity of 50 at 100° C. Mooney viscosity is a measurement of the deformability of a material, especially of a rubber. A low Mooney viscosity indicates a high deformability, and vice versa. The Mooney viscosity of the rubber and/or elastomer may be selected such that the curable composition is easy to be self-fusible and also has sufficient initial strength. Thus, the curable composition would have sufficient flexibility for being applied onto a special-shaped structure.

The uncrosslinked or partially crosslinked rubber and/or elastomer may comprise at least one selected from the group including uncrosslinked or partially crosslinked butyl rubber, fluoroelastomer (FKM), ethylene propylene diene rubber (EPDM), ethylene propylene rubber (EPR), nitrile rubber (NBR), hydrogenated nitrile rubber (HNBR), acrylate rubber (ACM), polyurethane rubber (PUR), nature rubber (NR), styrene butadiene rubber (SBR), polychloroprene rubber (CR), polybutadiene rubber (BR), polyisoprene rubber (IR), chlorosulfonated polyethylene (CSM), polysulfide rubber (PSR), and chlorohydrin rubber (CO). Preferably, the rubber and/or elastomer comprises at least one selected from the group consisting of butyl rubber, fluoroelastomer (FKM), hydrogenated nitrile rubber (HNBR), and ethylene propylene diene rubber (EPDM).

The initial strength-imparting agent may be commercially available and the examples thereof may comprise IIR 532 available from Xinhui Company, China.

According to certain embodiments of the invention, when the content of the initial strength-imparting agent in the composition is too low, the composition may be very tacky and the strength of the composition before curing may be possibly impaired, and the installation performance of the composition at high temperature of 60° C. may be possibly reduced. The initial strength-imparting agent can help to enhance the initial strength and elastic performance of the uncured composition, but the installation performance of the composition, especially at low temperature, may be possibly damaged when the content of the initial strength-imparting agent in the composition is too high.

According to certain embodiments of the invention, if present in the composition, the content of the initial strength-imparting agent in the composition may be generally in the range of 1%-40% by weight, preferably 2%-31% by weight and more preferably 2%-25% by weight, based on the total weight of the composition.

Plasticizer

The plasticizer can soften the total composition and may be also referred to as the softening agent.

The plasticizer may comprise at least one selected from the group including a liquid polyisobutene (PIB), a liquid paraffin, a naphthenic oil, an aromatic oil and the combination thereof. The viscosity of the plasticizer may range from 2 cst to 30,000 cst at 100° C., preferably from 2 cst to 10,000 cst at 100° C., and more preferably from 2 cst to 6,000 cst at 100° C.

The liquid PIB can be represented by the following formula:

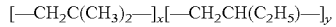

wherein x is from 5 to 20,000, preferably from 10 to 10,000, and more preferably from 50 to 5,000, and y is from 0 to 2,000, preferably from 0 to 1,000, and more preferably from 0 to 500.

The plasticizer may be commercially available and the examples thereof may comprise PB 2400 available from Daelim Company, Korea.

According to certain embodiments of the invention, the composition may be tacky and the strength for the uncured and cured compositions may be possibly impaired when the content of the plasticizer in the composition is too high and the flexibility of the composition may be possibly reduced when the content of the plasticizer in the composition is too low.

According to certain embodiments of the invention, if present in the composition, the content of the plasticizer in the composition may be generally in the range of 1%-40% by weight, preferably 4%-18% by weight and more preferably 4%-16%, based on the total weight of the composition.

According to certain embodiments of the invention, if present in the composition in combination, the total content of the initial strength-imparting agent and the plasticizer in the composition may be generally in the range of 1%-40% by weight, preferably 10%-40% by weight and more preferably 12%-32% by weight, based on the total weight of the composition.

Other Components

Generally, the rate of curing or crosslinking of the composition may depend on many factors such as ambient temperature and humidity, and the types of the crosslinker and the presence and type of the catalyst. When the composition does not include any catalyst, the rate of curing or crosslinking may be slow. Therefore, it is particularly preferable to add a catalyst to the composition in order to accelerate the curing or crosslinking of the composition such that the reactive or curable silicone may form a network structure with the crosslinker within a shorter time upon exposure to moisture.

Curing catalysts include organic tin compounds such as dibutyltin diacetate, dibutyltin dilaurate, and dibutyltin dioctoate; titanates and titanium chelates such as tetraisopropoxytitanium, tetra-n-butoxytitanium, tetrakis(2-ethylhexoxy)titanium, dipropoxybis(acetylacetonato)titanium, and titanium isopropoxyoctylene glycol; organometallic compounds such as zinc naphthenate, zinc stearate, zinc 2-ethyloctoate, iron 2-ethylhexoate, cobalt 2-ethylhexoate, manganese 2-ethylhexoate, cobalt naphthenate, and alkoxyaluminum compounds; quaternary ammonium salts such as benzyltriethylammonium acetate; alkali metal salts of lower fatty acids such as potassium acetate, sodium acetate and lithium oxalate; guanidyl-containing silanes or siloxanes such as tetramethylguanidylpropyltrimethoxysilane, tetramethylguanidylpropylmethyldimethoxysilane, tetramethylguanidylpropyltris(trimethylsiloxy)silane, (tetramethylguanidino) propyl triethoxysilane and mixtures comprising one or more of the foregoing. More preferably, the catalyst comprises at least one selected from the group consisting of titanium complex, tin salt such as dibutyltin diacetate, dibutyltin dilauryl, tin 2-ethyl hexanoate and the combination thereof.

Among them, titanium complex is preferably used as the catalyst in the composition because it is found that titanium complex allows for a moderate crosslinking rate of the composition when used in combination with the alkoxy silane crosslinker.

The catalytic amount of the catalyst may be added into the composition depending on the amount of the reactive or curable silicone. According to certain embodiments of the invention, the amount of the catalyst may be generally from 0.5% to 15% by weight, preferably from 1% to 8% by weight, and more preferably from 2% to 6% by weight, based on the amount of the reactive or curable silicone.

According to certain embodiments of the invention, the composition may further comprise at least one component selected from the group including a co-crosslinker, a reinforcing agent, an adhesive promoter, a pigment, a toner, a fire retardant, a surface modifier, a thickener, a rheology modifier, and the combination thereof, and preferably, a reinforcing agent, a fire retardant, a toner, and the combination thereof.

The fire retardant may comprise at least one selected from the group including $Al(OH)_3$, $Mg(OH)_2$, halogenated flame retardants, phosphorus flame retardants, and nitrogen-based flame retardants, and the specific examples thereof may comprise decapolybrominated diphenyl ether, polyammonium phosphate, and melamine. Some of the fire retardants such as $Al(OH)_3$ and $Mg(OH)_2$ may further act as the reinforcing agent.

According to certain embodiments of the invention, the content of the fire retardant may be generally in the range of 10%-90% by weight, preferably 15%-85% by weight, more preferably 20%-76% by weight and most preferably 29%-71% by weight, based on the total weight of the composition.

The toner may comprise at least one selected from the group including carbon black, iron oxide red, iron oxide black, chromium oxide green, titanium pigment, phthalocyanine and the combination thereof.

It is preferable that the composition comprises trimethoxysilane, carbon black, and $Al(OH)_3$.

According to certain embodiments of the invention, the content of the toner may be generally in the range of 0.1%-5% by weight, preferably 0.5%-2% by weight and more preferably 0.5%-1.5% by weight, based on the total weight of the composition.

The reinforcing agent may be compounded such that the composition has improved strength before and after curing. Furthermore, the reinforcing agent may increase the viscosity of the composition. Suitable reinforcing fillers include finely divided silica, fumed silica, silica aerogel, precipitated silica, diatomaceous earth, metal oxides such as iron oxide, titanium oxide, and aluminum oxide, metal nitrides such as boron nitride and aluminum nitride, metal carbonates such as calcium carbonate, magnesium carbonate and zinc carbonate, asbestos, glass wool, powdered mica, powdered fused silica, powdered synthetic resins such as polystyrene, polyvinyl chloride, and polypropylene, and the like. Preferably, the fillers are previously dried to remove water prior to use.

The preferable examples of the reinforcing agent may comprise at least one selected from the group including fumed silica, $CaCO_3$, titanium oxide, mica and the combination thereof. The reinforcing agent may further comprise $Al(OH)_3$, $Mg(OH)_2$ and the mixture thereof as well as the combination thereof with any other reinforcing agent such as the above preferable examples of the reinforcing agent.

According to certain embodiments of the invention, the content of the reinforcing agent may be generally in the range of 0.5%-90% by weight, preferably 1%-85% by weight, more preferably 1%-20% by weight and most preferably 1%-10% by weight, based on the total weight of the composition.

Other components such as co-crosslinker, an adhesive promoter, a pigment, a surface modifier, a thickener, and a rheology modifier may be added in any desired amount that does not adversely affect the property of the composition.

Next, the method of producing the curable composition according to the invention will be described.

The curable composition may be prepared by a method which comprises blending components of the composition at predetermined ratios. In certain embodiments, the blending step may be performed rapidly under ambient environment (RT) because the curing rate of the curable composition is so slow that the composition may be not cured after the rapid blending. In other embodiments, the blending step may be performed under vacuum condition. Preferably, the blending step is implemented under vacuum condition. The blending can be conducted by a conventional kneader or mixer.

The curable composition according to embodiments of the invention may be further molded or shaped into an article in the form of a pad, a plate, a sheet, a film, a rod, a tape, a paste or plasticine.

A kneader, extruder or calender conventionally used in the art may be used in the preparation of the article. For example, a sheet-shaped article may be obtained by subjecting the composition to extruding and/or calendaring using an extruder and/or calender. The extruding temperature may be generally from 0° C. to 150° C., and the extruding pressure may be generally from 0.5 MPa to 15 MPa. The calendaring temperature may be generally from 0° C. to 100° C.

The article according to embodiments of the invention may be self-fusible. The article may be stored in a waterproof or vacuum package after the production and before use.

It should be noted that occasional or minor curing may take place during preparation, formation, storage, and delivery of the curable composition or article. However, these partly cured forms of the composition or article is trifle and can be acceptable and ignored in the invention.

According to certain embodiments of the invention, the composition or the article according to embodiments of the invention may be applied for electrical devices, electronic devices, semiconductor devices, and medical devices. In particular, the composition or the article according to the invention may be applied for electric devices or electronic devices such as connector/cable assembly. In other embodiments, the composition or the article according to the invention may be also used for children protection products.

Accordingly, the invention further provides a device comprising the composition or the article according to the invention which has been subjected to the curing. The device may be selected from the group consisting of electrical devices, electronic devices, semiconductor devices, and medical devices.

The invention also provides a method of using the article according to the invention comprising a step of applying the article onto a surface of a substrate and a step of curing the article by exposing it to moisture. According to certain embodiments of the invention, the substrate may be made from at least one material selected from the group including stainless steel, polyvinylchloride (PVC), polyethylene (PE) and the combination thereof.

According to certain embodiments of the invention, the substrate can be a connector/cable assembly, and the article can be in the form of a pad.

FIG. 1 shows a schematic view of a connector/cable assembly. As shown in FIG. 1, a connector/cable assembly (10) consists of a cable (100) and a connector (101).

Figure 2:
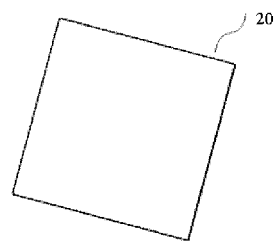
FIG. 2 shows a schematic view of a pad produced from the composition according to certain embodiments of the invention.

FIG. 2 shows a shape of a pad (20) produced from the composition according to certain embodiments of the invention.

According to certain embodiments of the invention, the pad can be pressed onto the surface of the connector/cable assembly by an installation clip. According to other embodiments of the invention, the pad may be applied onto the surface of the connector/cable assembly by hands. It is preferable that the pad is pressed onto the surface of the connector/cable assembly by an installation clip. Hereinafter, the structure of the installation clip will be described in detail.

Figure 3:
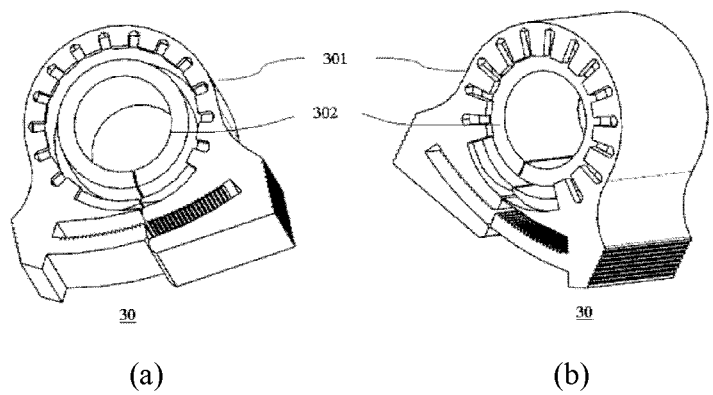
FIG. 3 shows a schematic view of an installation clip used in the method of using the article according to certain embodiments of the invention as viewed from one end thereof (a) and the other end thereof (b)
Figure 4:
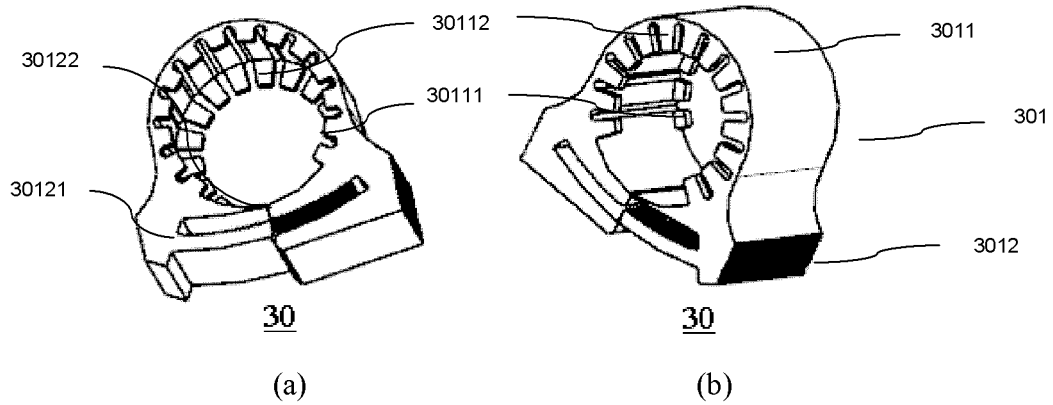
FIG. 4 shows schematic views of the installation clip from which the annular inner foam has been removed as viewed from one end thereof (a) and the other end thereof (b)

FIG. 3 shows a schematic view of an installation clip 30 used in the method of using the article according to certain embodiments of the invention as viewed from one end thereof (a) and the other end thereof (b). As shown in FIG. 3, the installation clip (30) comprises an outer shelter (301) and an annular inner foam (302) disposed insider the outer shelter (301). FIG. 4 shows schematic views of the installation clip from which the annular inner foam has been removed as viewed from one end thereof (a) and the other end thereof (b). As shown in FIG. 4, the outer shelter (301) comprises an annular shelter portion (3011) and a gripping portion (3012). The annular shelter portion (3011) has inner and outer wall surfaces and two ends and comprises shorter pressing teeth (30111) provided along the inner wall surface at one end and longer pressing teeth (30112) provided along the inner wall surface at the other end. The gripping portion (3012) is integrated onto the outer wall surface of the annular shelter portion (3011) and comprises a pair of opposite install teeth (30121, 30122) capable of being engaged with each other.

Figure 5:
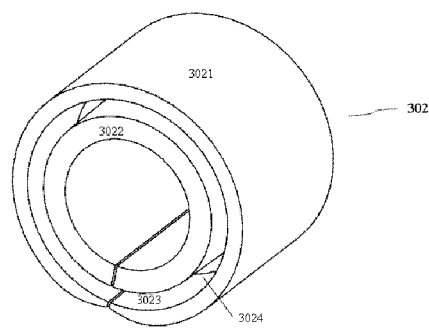
FIG. 5 shows a schematic view of the annular inner foam of the installation clip.

FIG. 5 shows a schematic view of the annular inner foam of the installation clip. As shown in FIG. 5, the annular inner foam (302) comprises concentric outer layer (3021) and inner layer (3022) which are separated via an annular space (3023) and connected to each other by ribs (3024).

In certain embodiments, the annular inner foam may be made from at least one material selected from the group including polyurethane rubber, siloxane rubber and the combination thereof in order to make the annular inner foam to adapt to the connector/cable assembly having different diameter. In certain embodiments, the outer shelter may be made from plastics and preferably nylon 66.

Figure 6:
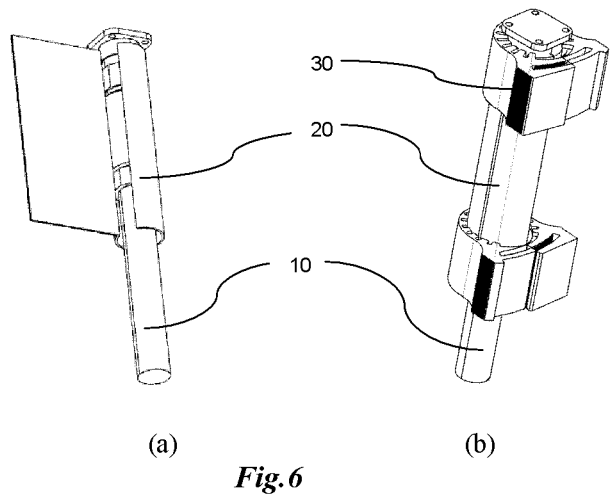
FIG. 6 is a schematic view of the process of installing the pad according to certain embodiments onto a surface of the connector/cable assembly, wherein (a) shows a step of wrapping the pad onto a surface of the connector/cable assembly, and (b) shows a step of pressing the pad by using the installation clip.

Next, the process of installing the pad according to certain embodiments onto a surface of the connector/cable assembly by using the installation clip will be described with reference to FIG. 6. FIG. 6(a) shows a step of wrapping the pad onto a surface of the connector/cable assembly, and FIG. 6(b) shows a step of pressing the pad by using the installation clip. As shown in FIG. 6 (a), the pad (20) is firstly wrapped onto a surface of the connector/cable assembly (10). Then, one installation clip (30) is provided on the cable side of the connector/cable assembly (10) such that the shorter pressing teeth (shown in FIG. 4) of the installation clip (30) surround a surface of the wrapped pad (20) and the longer pressing teeth (shown in FIG. 4) of the installation clip (30) surround a surface of the cable in the connector/cable assembly (10) and another installation clip (30) is provided on the connector side of the connector/cable assembly (10) such that the shorter pressing teeth (shown in FIG. 4) surround a surface of the wrapped pad (10) and the longer pressing teeth (shown in FIG. 4) surround a surface of the connector in the connector/cable assembly (10), as shown in FIG. 6(b). When the installation clips are provided in place, the gripping portion of the installation clip is pressed by hands, the shorter pressing teeth will press the pad until the long pressing teeth touch a surface of the cable or connector. Finally, the installation clip is removed after finishing the installation.

According to embodiments of the invention, the article such as pad according to embodiments of the invention can be easily installed onto a surface of the substrate such as connector/cable assembly. Further, the pad according to embodiments of the invention is easily peeled from the substrate such as connector/cable assembly so that the periodic inspection or maintenance is convenient for the operator.

Figure 7:
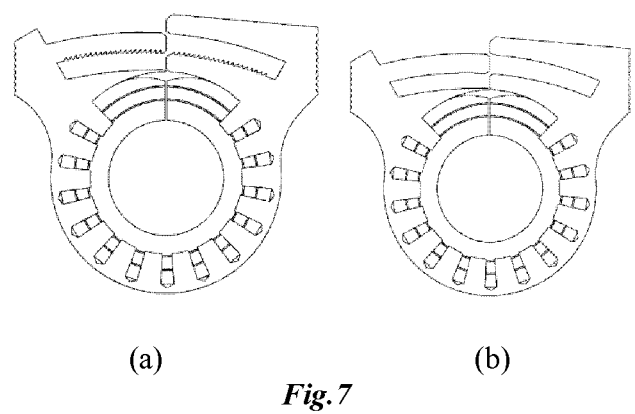
FIG. 7 shows a schematic view of the two types of the installation clips wherein the pair of opposite install teeth are indented at the opposite side surfaces thereof (a) and wherein the pair of opposite install teeth are smooth at the opposite side surfaces thereof (b).

In certain embodiments of the invention, the pair of opposite install teeth are indented at the opposite side surfaces thereof. In other embodiments of the invention, the pair of opposite install teeth are smooth at the opposite side surfaces thereof. FIG. 7 shows a schematic view of the two types of the installation clips, wherein the pair of opposite install teeth are indented at the opposite side surfaces thereof (a) and wherein the pair of opposite install teeth are smooth at the opposite side surfaces thereof (b). In the case where the installation clip as shown in FIG. 7(a) is used, the pair of install teeth are tightly engaged with each other when the gripping portion of the installation clip is pressed by hands such that they cannot return to the original state after removing the force applied by hands. Therefore, after finishing the installation, this installation clip must be destructively removed. Accordingly, this installation clip is not reusable. In the case where the installation clip as shown in FIG. 7(b) is used, the install teeth can return to the original state when removing the force applied by hands. Therefore, after finishing the installation, this installation clip can be removed scathelessly. Accordingly, this installation clip is reusable.

EXAMPLES

Hereinafter, the invention will be understood and appreciated more fully from the following preferable examples, and the examples are intended to be used for illustrating the invention and not for limiting the invention.

Unless otherwise indicated, the amount of each component used in the examples is based on weight.

Raw Materials

The raw materials used in the examples are listed in the Table below.

| Tradename | Chemical name | Producer |
|---|---|---|
| 107 Silicone Rubber | Hydroxyl-containing silicone rubber with 400,000 cps viscosity | Jiangsu Hongda Industrial Co., Ltd, China |
| IIR 532 | Butyl rubber | Xinhui Company, China |
| Aerosil 8200 | Hydrophobic fumed silica | Evonik Degussa Specialty Chemicals (Shanghai) Co., Ltd, China |
| D62 | Titanium complex | Hubei Xinlantian Industry Co., Ltd, China |
| D20 | Methyltrimethoxysilane | Hubei Xinlantian Industry Co., Ltd, China |
| N550 | Carbon black | Cabot Chemical Co., Ltd, USA |
| Aluminum Hydroxide | Al(OH)$_3$ | Guangdong Guanghua Chemical Co., Ltd, China |
| PB 2400 | Polyisobutylene | Daelim Company, Korea |
| SSR | Solid silicone rubber: Mn 510,000, Vinyl content: 0.16% | Xin An Chemical Co., Ltd, China |
| DC200-50 | Polydimethysiloxane | Dow Corning, USA |
| EPDM | Ethylene propylene terpolymer | LANXESS, Germany |
| Liquid Paraffin | Paraffin oil | Suzhou Saipahan Special Oil Co., Ltd, China |
| Calcium Carbonate | CaCO$_3$ | Kunshan Jinkaidi Chemical Co., Ltd, China |

Examples 1-25

IIR 532, 107 Silicone Rubber, PB 2400, SSR, DC200-50, Aluminum Hydroxide, Aerosil 8200, N550, D20 and D62 were added into a kneader at the amounts as shown in the Table 1 and kneaded to form an uniform composition.

Each of the above compositions was extruded by an extruder (manufactured by Guangzhou Putong Company) at a temperature of 60° C. and a pressure of 6 MPa and calendared by a calenderer (manufactured by Guangzhou Putong Company) at room temperature (RT) to form a 2 mm-thick pad.

Finally, the pad was installed onto a connector/cable assembly and cured by exposing it to ambient environment (RT).

TABLE 1

Formulation of the composition.

| No. | IIR 532 (g) | 107 Silicone Rubber (g) | PB 2400 (g) | SSR (g) | DC200-50 (g) | Aluminum Hydroxide (g) | Aerosil 8200 (g) | N550 (g) | D20 (g) | D62 (g) | Total (g) |
|---|---|---|---|---|---|---|---|---|---|---|---|
| Ex. 1 | 24.56 | 24.56 | 0.00 | 18.51 | 0.00 | 29.02 | 1.72 | 1.14 | 1.02 | 0.53 | 100 |
| Ex. 2 | 13.90 | 20.84 | 6.95 | 14.88 | 0.00 | 39.02 | 1.72 | 1.14 | 1.02 | 0.53 | 100 |
| Ex. 3 | 8.58 | 17.16 | 8.58 | 12.25 | 0.00 | 49.02 | 1.72 | 1.14 | 1.02 | 0.53 | 100 |
| Ex. 4 | 5.72 | 17.16 | 11.44 | 12.25 | 0.00 | 49.02 | 1.72 | 1.14 | 1.02 | 0.53 | 100 |
| Ex. 5 | 5.62 | 16.87 | 11.24 | 12.05 | 0.00 | 48.19 | 3.37 | 1.12 | 1.00 | 0.52 | 100 |
| Ex. 6 | 2.86 | 17.16 | 14.30 | 12.25 | 0.00 | 49.02 | 1.72 | 1.14 | 1.02 | 0.53 | 100 |
| Ex. 7 | 0.00 | 9.42 | 9.42 | 6.73 | 0.00 | 70.02 | 1.72 | 1.14 | 1.02 | 0.53 | 100 |
| Ex. 8 | 7.34 | 17.12 | 0.00 | 5.83 | 0.00 | 65.11 | 1.79 | 1.19 | 1.06 | 0.55 | 100 |
| Ex. 9 | 6.75 | 20.24 | 6.75 | 12.05 | 0.00 | 48.19 | 3.37 | 1.12 | 1.00 | 0.52 | 100 |
| Ex. 10 | 9.00 | 20.24 | 4.50 | 12.05 | 0.00 | 48.19 | 3.37 | 1.12 | 1.00 | 0.52 | 100 |
| Ex. 11 | 6.49 | 19.46 | 6.49 | 15.44 | 0.00 | 46.33 | 3.24 | 1.08 | 0.97 | 0.50 | 100 |
| Ex. 12 | 8.43 | 16.87 | 8.43 | 12.05 | 0.00 | 48.19 | 3.37 | 1.12 | 1.00 | 0.52 | 100 |
| Ex. 13 | 8.29 | 16.59 | 8.29 | 11.85 | 0.00 | 47.39 | 4.98 | 1.11 | 0.99 | 0.51 | 100 |
| Ex. 14 | 9.17 | 18.34 | 9.17 | 13.10 | 0.00 | 43.67 | 3.67 | 1.22 | 1.09 | 0.57 | 100 |
| Ex. 15 | 10.05 | 20.10 | 10.05 | 14.35 | 0.00 | 38.28 | 4.02 | 1.34 | 1.20 | 0.62 | 100 |
| Ex. 16 | 9.37 | 18.73 | 9.37 | 13.38 | 0.00 | 43.76 | 3.01 | 1.00 | 0.90 | 0.47 | 100 |
| Ex. 17 | 7.78 | 15.55 | 7.78 | 7.41 | 0.00 | 55.21 | 3.51 | 1.17 | 1.05 | 0.54 | 100 |
| Ex. 18 | 7.09 | 14.19 | 7.09 | 13.51 | 0.00 | 40.33 | 3.24 | 1.08 | 0.97 | 0.50 | 100 |
| Ex. 19 | 15.49 | 20.66 | 15.49 | 12.30 | 0.00 | 30.21 | 3.51 | 1.17 | 1.05 | 0.54 | 100 |
| Ex. 20 | 6.94 | 13.88 | 6.94 | 0.00 | 3.30 | 62.40 | 3.67 | 1.22 | 1.09 | 0.57 | 100 |
| Ex. 21 | 8.61 | 17.21 | 8.61 | 0.00 | 6.15 | 53.28 | 3.44 | 1.15 | 1.02 | 0.53 | 100 |
| Ex. 22 | 8.11 | 16.22 | 8.11 | 0.00 | 7.72 | 54.05 | 3.24 | 1.08 | 0.97 | 0.50 | 100 |
| Ex. 23 | 7.66 | 15.33 | 7.66 | 0.00 | 9.12 | 54.74 | 3.07 | 1.02 | 0.91 | 0.47 | 100 |
| Ex. 24 | 6.91 | 13.82 | 6.91 | 0.00 | 8.22 | 59.21 | 2.76 | 0.92 | 0.21 | 0.43 | 100 |
| Ex. 25 | 5.93 | 11.86 | 5.93 | 0.00 | 9.89 | 62.15 | 2.37 | 0.79 | 0.71 | 0.37 | 100.00 |

Examples 26-27

EPDM, 107 Silicone Rubber, Liquid Paraffin, SSR, DC200-50, Aluminum Hydroxide, Aerosil 8200, N550, D20 and D62 were added into a kneader at the amounts as shown in the Table 2 and kneaded to form an uniform composition.

Each of the above compositions was extruded by an extruder (manufactured by Guangzhou Putong Company) at a temperature of 60° C. and a pressure of 6 MPa and calendared by a calenderer (manufactured by Guangzhou Putong Company) at room temperature (RT) to form a 2 mm-thick pad.

Finally, the pad was installed onto a connector/cable assembly and cured by exposing it to ambient environment (RT).

TABLE 2

Formulation of the composition.

| | EPDM (g) | 107 Silicone Rubber (g) | Liquid Paraffin (g) | SSR (g) | DC200-50 (g) | Aluminum Hydroxide (g) | Aerosil 8200 (g) | N550 (g) | D20 (g) | D62 (g) | Total (g) |
|---|---|---|---|---|---|---|---|---|---|---|---|
| Example 26 | 8.58 | 17.16 | 8.58 | 12.25 | 0.00 | 49.02 | 1.72 | 1.14 | 1.02 | 0.53 | 100 |
| Example 27 | 8.61 | 17.21 | 8.61 | 0.00 | 6.15 | 53.28 | 3.44 | 1.15 | 1.02 | 0.53 | 100 |

Examples 28-29

EPDM, 107 Silicone Rubber, Liquid Paraffin, SSR, DC200-50, Calcium Carbonate, Aerosil 8200, N550, D20 and D62 were added into a kneader at the amounts as shown in the Table 3 and kneaded to form an uniform composition.

Each of the above compositions was extruded by an extruder (manufactured by Guangzhou Putong Company) at a temperature of 60° C. and a pressure of 6 MPa and calendared by a calenderer (manufactured by Guangzhou Putong Company) at room temperature (RT) to form a 2 mm-thick pad.

Finally, the pad was installed onto a connector/cable assembly and cured by exposing it to ambient environment (RT).

TABLE 3

Formulation of the composition.

| | EPDM (g) | 107 Silicone Rubber (g) | Liquid Paraffin (g) | SSR (g) | DC200-50 (g) | Calcium Carbonate (g) | Aerosil 8200 (g) | N550 (g) | D20 (g) | D62 (g) | Total (g) |
|---|---|---|---|---|---|---|---|---|---|---|---|
| Example 28 | 8.11 | 16.22 | 8.11 | 0.00 | 7.72 | 54.05 | 3.24 | 1.08 | 0.97 | 0.50 | 100 |
| Example 29 | 7.66 | 15.33 | 7.66 | 0.00 | 9.12 | 54.74 | 3.07 | 1.02 | 0.91 | 0.47 | 100 |

Test Methods (1) Waterproofing Performance

The connector/cable assembly with cured pad was subjected to the water immersion test as follows. The above sample was put into 1 m-deep water and immersed for 72 h.

Pass/Fail Criteria: in the case where the sample didn't exhibit any physical damage and water penetration and the cable was not corroded, this sample was evaluated to "Pass" the test; otherwise, the sample was evaluated to "Fail" the test.

(2) Vibration Resistance

The connector/cable assembly with the cured pad was subjected to the vibration test by using JSA enclosure vibration machine (manufactured by Beijing University of posts & telecommunications and Beijing blade telecom technical development Co., Ltd) at a frequency of 10 Hz and an amplitude of +3 mm for 24 h. After the vibration, this sample was subjected to the water immersion test for 72 h.

Pass/Fail Criteria: in the case where the vibration didn't result in any permanent physical damage to the sample and the sample didn't exhibit water penetration after the water immersion, this sample was evaluated to "Pass" the test; otherwise, the sample was evaluated to "Fail" the test.

(3) Installation Performance (3-1) Installation Performance at −10° C.

The pad was placed at −10° C. for 4 h and then installed onto a connector/cable assembly and cured for 24 h under ambient environment (RT). Then, the connector/cable assembly with the cured pad was subjected to the water immersion test for 72 h.

Pass/Fail Criteria: in the case where the installation didn't result in any permanent physical damage to the sample and the sample didn't exhibit water penetration after the water immersion, this sample was evaluated to "Pass" the test; otherwise, the sample was evaluated to "Fail" the test.

(3-2) Installation Performance at 60° C.

The pad was placed at 60° C. for 4 h and then installed onto a connector/cable assembly and cured for 24 h under ambient environment (RT). Then, the connector/cable assembly with the cured pad was subjected to the water immersion test for 72 h.

Pass/Fail Criteria: in the case where the installation didn't result in any permanent physical damage to the sample and the sample didn't exhibit water penetration after the water immersion, this sample was evaluated to "Pass" the test; otherwise, the sample was evaluated to "Fail" the test.

The results obtained by the above performance tests are summarized in the Table 4 below.

TABLE 4

| No. | Waterproofing performance | Vibration resistance | Installation performance −10° C | Installation performance 60° C |
|---|---|---|---|---|
| Ex. 1 | PASS | PASS | PASS | PASS |
| Ex. 2 | PASS | PASS | PASS | PASS |
| Ex. 3 | PASS | PASS | PASS | PASS |
| Ex. 4 | PASS | PASS | PASS | PASS |
| Ex. 5 | PASS | PASS | PASS | PASS |
| Ex. 6 | PASS | PASS | PASS | PASS |
| Ex. 7 | PASS | PASS | PASS | PASS |
| Ex. 8 | PASS | PASS | PASS | PASS |
| Ex. 9 | PASS | PASS | PASS | PASS |
| Ex. 10 | PASS | PASS | PASS | PASS |
| Ex. 11 | PASS | PASS | PASS | PASS |
| Ex. 12 | PASS | PASS | PASS | PASS |
| Ex. 13 | PASS | PASS | PASS | PASS |
| Ex. 14 | PASS | PASS | PASS | PASS |
| Ex. 15 | PASS | PASS | PASS | PASS |
| Ex. 16 | PASS | PASS | PASS | PASS |
| Ex. 17 | PASS | PASS | PASS | PASS |
| Ex. 18 | PASS | PASS | PASS | PASS |
| Ex. 19 | PASS | PASS | PASS | PASS |
| Ex. 20 | PASS | PASS | PASS | PASS |
| Ex. 21 | PASS | PASS | PASS | PASS |
| Ex. 22 | PASS | PASS | PASS | PASS |
| Ex. 23 | PASS | PASS | PASS | PASS |
| Ex. 24 | PASS | PASS | PASS | PASS |
| Ex. 25 | PASS | PASS | PASS | PASS |
| Ex. 26 | PASS | PASS | PASS | PASS |
| Ex. 27 | PASS | PASS | PASS | PASS |
| Ex. 28 | PASS | PASS | PASS | PASS |
| Ex. 29 | PASS | PASS | PASS | PASS |

As can be seen from the above Table 4, the examples 1-29 of the invention have passed the waterproofing test, the vibration test, and the installation test, which shows that the composition or pad of the invention has superior waterproofing performance which is necessary for outdoor application, high vibration resistance and high installation performance.

(4) Weatherproofing Properties (4-1) UV Aging Test

The UV aging resistance of the connector/cable assembly with the cured pad or composition was measured according to GB\T1865-1997 (time: 1000 h).

(4-2) Aging Test at 85° C. and 85% RH

The connector/cable assembly with the cured pad was placed in a FLX300 High and low temperature tester (manufactured by Envirotronics) at 85+5% RH and 85° C. to observe a surface of the pad. Then, this sample was subjected to the water immersion test for 72 h.

Pass/Fail Criteria: in the case where the sample was observed to have no crack at the surface thereof and didn't exhibit water penetration after the water immersion, this sample was evaluated to "Pass" the test; otherwise, the sample was evaluated to "Fail" the test.

(4-3) Aging Test at 100° C. for 96 h

The connector/cable assembly with the cured pad was placed in an oven at 100° C. for 96 h. The sample was then taken out and cooled at room temperature for 2 h, and subjected to the water immersion test for 72 h.

Pass/Fail Criteria: in the case where the sample was observed to have no crack at the surface thereof and didn't exhibit water penetration after the water immersion, this sample was evaluated to "Pass" the test; otherwise, the sample was evaluated to "Fail" the test.

(4-4) Temperature Cycling Test

The connector/cable assembly with the cured pad was placed in a FLX300 High and low temperature tester (manufactured by Envirotronics) and subjected to the temperature cycling as follows: at 0° C. for 4 h; at −40° C. for 4 h; between 70° C. and 40° C. for less than 4 h. After 9 cycles, the sample was taken out and subjected to the water immersion test for 72 hours.

Pass/Fail Criteria: in the case where the sample didn't exhibit physical damage and water penetration and the cable was not corroded, this sample was evaluated to "Pass" the test; otherwise, the sample was evaluated to "Fail" the test.

(5) Fire Retardance Test

The fire retardance of the cured pad was measured according to UL-94 standard.

The results obtained by the above performance tests are summarized in the Table 5 below.

TABLE 5

| No. | Fire retardance test | Temperature cycling test | Aging test at 85° C. and 85% HR | Aging test at 100° C. for 96 h | UV aging test |
|---|---|---|---|---|---|
| Ex. 1 | V2~V1 | PASS | PASS | PASS | PASS |
| Ex. 2 | V2~V1 | PASS | PASS | PASS | PASS |
| Ex. 3 | V0 | PASS | PASS | PASS | PASS |
| Ex. 4 | V0 | PASS | PASS | PASS | PASS |
| Ex. 5 | V0 | PASS | PASS | PASS | PASS |
| Ex. 6 | V0 | PASS | PASS | PASS | PASS |
| Ex. 7 | V0 | PASS | PASS | PASS | PASS |
| Ex. 8 | V0 | PASS | PASS | PASS | PASS |
| Ex. 9 | V0 | PASS | PASS | PASS | PASS |
| Ex. 10 | V1~V0 | PASS | PASS | PASS | PASS |
| Ex. 11 | V2~V1 | PASS | PASS | PASS | PASS |
| Ex. 12 | V0 | PASS | PASS | PASS | PASS |
| Ex. 13 | V0 | PASS | PASS | PASS | PASS |
| Ex. 14 | V0 | PASS | PASS | PASS | PASS |
| Ex. 15 | V0 | PASS | PASS | PASS | PASS |
| Ex. 16 | V0 | PASS | PASS | PASS | PASS |
| Ex. 17 | V0 | PASS | PASS | PASS | PASS |
| Ex. 18 | V0 | PASS | PASS | PASS | PASS |
| Ex. 19 | V2~V1 | PASS | PASS | PASS | PASS |
| Ex. 20 | V0 | PASS | PASS | PASS | PASS |
| Ex. 21 | V0 | PASS | PASS | PASS | PASS |
| Ex. 22 | V0 | PASS | PASS | PASS | PASS |
| Ex. 23 | V0 | PASS | PASS | PASS | PASS |
| Ex. 24 | V0 | PASS | PASS | PASS | PASS |
| Ex. 25 | V0 | PASS | PASS | PASS | PASS |
| Ex. 26 | V0 | PASS | PASS | PASS | PASS |
| Ex. 27 | V0 | PASS | PASS | PASS | PASS |
| Ex. 28 | <V2 | PASS | PASS | PASS | PASS |
| Ex. 29 | <V2 | PASS | PASS | PASS | PASS |

As can be seen from the above Table 5, the examples 1-29 of the invention have passed the UV aging test, the aging test at 100° C. for 96 h, the aging test at 85° C. and 85% HR, and the temperature cycling test, which shows that the composition or pad of the invention has high weatherproofing properties comprising UV resistance and heat resistance, which are necessary for outdoor application. Further, the examples 1-27 of the invention further have superior fire retardance since the composition comprises the fire retardant. In addition, the fire retardance of the examples 28-29 of the invention is lower than V2 grade because the composition does not comprise the fire retardant.

(3) Peel Strength Test

The strength of peeling the cured pad installed on the connector/cable assembly consisting of the connector made from stainless steel and the cable made from PVC or PE was measured according to ASTM D330 90 degree test standard.

The results obtained by the above performance test are summarized in the Table 6 below.

TABLE 6

| No. | from stainless steel (N/cm) | from PVC (N/cm) | from PE (N/cm) |
| --- | --- | --- | --- |
| Ex. 1 | 0.96 | 0.38 | 0.22 |
| Ex. 2 | 0.78 | 0.33 | 0.22 |
| Ex. 3 | 0.78 | 0.45 | 0.46 |
| Ex. 4 | 0.85 | 0.44 | 0.39 |
| Ex. 5 | 0.88 | 0.46 | 0.33 |
| Ex. 6 | 0.98 | 0.56 | 0.57 |
| Ex. 7 | 0.79 | 0.42 | 0.42 |
| Ex. 8 | 0.93 | 0.58 | 0.46 |
| Ex. 9 | 1.12 | 0.75 | 0.63 |
| Ex. 10 | 0.93 | 0.66 | 0.53 |
| Ex. 11 | 0.97 | 0.55 | 0.39 |
| Ex. 12 | 0.68 | 0.38 | 0.29 |
| Ex. 13 | 0.63 | 0.41 | 0.32 |
| Ex. 14 | 0.88 | 0.43 | 0.46 |
| Ex. 15 | 1.08 | 0.68 | 0.59 |
| Ex. 16 | 0.64 | 0.31 | 0.29 |
| Ex. 17 | 0.66 | 0.40 | 0.29 |
| Ex. 18 | 0.58 | 0.28 | 0.19 |
| Ex. 19 | 0.53 | 0.20 | 0.18 |
| Ex. 20 | 0.98 | 0.60 | 0.42 |
| Ex. 21 | 0.67 | 0.48 | 0.33 |
| Ex. 22 | 0.59 | 0.28 | 0.26 |
| Ex. 23 | 0.36 | 0.22 | 0.15 |
| Ex. 24 | 0.45 | 0.31 | 0.22 |
| Ex. 25 | 0.39 | 0.29 | 0.21 |
| Ex. 26 | 0.48 | 0.32 | 0.28 |
| Ex. 27 | 0.51 | 0.39 | 0.31 |
| Ex. 28 | 0.52 | 0.38 | 0.29 |
| Ex. 29 | 0.45 | 0.34 | 0.23 |

The connector/cable assembly with the cured pad is often inspected or repaired periodically. Therefore, the composition or pad installed on the assembly is required to have certain peel strength to be conveniently peeled from the assembly. Generally, too high peel strength may result in that the composition or pad is easily broken or remained on the assembly, while too low peel strength may result in that the adhesion of the composition or pad to the assembly is sufficient, leading to insufficient waterproofing performance of the assembly. Therefore, proper peel strength is important to ensure the removable performance and waterproofing performance of the pad or composition. Generally, it is desirable that the peel strength of the pad or composition with a stainless steel substrate or stainless steel connector should be between 0.36 and 1.12 N/cm, the peel strength of the pad or composition with a PVC substrate or cable should be between 0.22 and 0.75 N/cm, and the peel strength of the pad or composition with a PE substrate or cable should be between 0.15 and 0.63 N/cm. As shown in the Table 6, the peel strength of the pad or composition of each of the examples 1-29 from a stainless steel substrate or connector are between 0.36 and 1.12 N/cm, the peel strength of the pad or composition of each of the examples 1-29 from a PVC substrate or cable are between 0.22 and 0.75 N/cm, and the peel strength of the pad or composition of each of the examples 1-29 from a PE substrate or cable are between 0.15 and 0.63 N/cm, which shows that the pad or composition according to the invention can ensure both the easy or clean peel from the connector/cable assembly and the sufficient waterproofing performance of the assembly.

The following embodiments are intended to illustrate the invention in an exemplary, not limiting way.

The embodiment 1 is a moisture curable composition, comprising: a reactive or curable silicone; a crosslinker; an unreactive silicone; and at least of an initial strength-imparting agent and a plasticizer.

The embodiment 2 is the composition according to the embodiment 1, wherein the ratio of the reactive or curable silicone to the unreactive silicone is in the range of 1:10 to 40:1 by weight, preferably 5:10 to 30:1 by weight and more preferably 5:10 to 10:1 by weight.

The embodiment 3 is the composition according to the embodiment 1 or 2, further comprising a catalyst.

The embodiment 4 is the composition according to any one of preceding the embodiments, wherein the reactive or curable silicone comprises at least one selected from the group consisting of a hydroxyl-containing silicone resin, an alkoxyl-containing silicone resin, and the combination thereof.

The embodiment 5 is the composition according to the embodiment 4, wherein the alkoxyl-containing silicone resin comprises at least one selected from the group consisting of a methoxyl-containing silicone resin, an ethoxyl-containing silicone resin, and the combination thereof.

The embodiment 6 is the composition according to any one of preceding the embodiments, wherein the unreactive silicone comprises at least one selected from the group consisting of a high molecular weight solid silicone rubber, a low molecular weight silicone oil and the combination thereof.

The embodiment 7 is the composition according to the embodiment 6, wherein the high molecular weight solid silicone rubber or low molecular weight silicone oil comprises at least one selected from the group consisting of polydimethylsiloxane silicone rubber or oil, polymethylvinylsilicone rubber or oil, polymethylphenylsilicone rubber or oil and the combination thereof.

The embodiment 8 is the composition according to any one of preceding the embodiments, wherein the plasticizer comprises at least one selected from the group consisting of a liquid polyisobutene, a liquid paraffin, a naphthenic oil, an aromatic oil and the combination thereof.

The embodiment 9 is the composition according to any one of preceding the embodiments, wherein the initial strength-imparting agent comprises at least one uncrosslinked or partially crosslinked rubber and/or elastomer.

The embodiment 10 is the composition according to any one of preceding the embodiments, wherein the reactive or curable silicone has a Mn of from 10,000 to 3,000,000, preferably from 100,000 to 2,000,000, and more preferably from 500,000 to 2,000,000.

The embodiment 11 is the composition according to any one of preceding the embodiments, wherein the reactive or curable silicone has a viscosity of 10,000 cps or more, preferably from 50,000 cps to 2,000,000 cps, preferably from 100,000 cps to 1,500,000 cps, and more preferably from 300,000 cps to 1,000,000 cps.

The embodiment 12 is the composition according to the embodiment 9, wherein the rubber and/or elastomer has a Mooney viscosity of at least 10 at 100° C., preferably in the range of 20 to 200 at 100° C., preferably in the range of 40 to 150 at 100° C., and more preferably in the range of 50 to 100 at 100° C.

The embodiment 13 is the composition according to the embodiment 9, wherein the rubber and/or elastomer comprises at least one selected from the group including butyl rubber, fluoroelastomer (FKM), ethylene propylene diene rubber (EPDM), ethylene propylene rubber (EPR), nitrile rubber (NBR), hydrogenated nitrile rubber (HNBR), acrylate rubber (ACM), polyurethane rubber (PUR), nature rubber (NR), styrene butadiene rubber (SBR), polychloroprene rubber (CR), polybutadiene rubber (BR), polyisoprene rubber (IR), chlorosulfonated polyethylene (CSM), polysulfide rubber (PSR), chlorohydrin rubber (CO), and the combination thereof.

The embodiment 14 is the composition according to the embodiment 9, wherein the rubber and/or elastomer comprises at least one selected from the group including butyl rubber, fluoroelastomer (FKM), hydrogenated nitrile rubber (HNBR), ethylene propylene diene rubber (EPDM), and the combination thereof.

The embodiment 15 is the composition according to any one of preceding the embodiments, wherein the crosslinker comprises at least one selected from the group including methyltriacetoxysilane, methyltrimethoxysilane, methyl tri (isopropenyloxy) silane, methyltrimethylethylketoximesilane, vinyltrimethoxysilane, vinyltriethoxysilane, γ-(meth-acryloxy)propyltrimethoxysilane, aminopropyltriethoxysilane, N-(β-aminoethyl)-γ-aminopropyltrimethoxysilane, γ-(2,3-epoxypropoxy)propyltrimethoxysilane, γ-mercaptopropyltriethoxysilane, γ-mercaptopropyltrimethoxysilane, methyltriethoxysilane, tetramethoxysilane, tetrapropoxysilane, tetraethoxysilane, and ethyltriacetoxysilane.

The embodiment 16 is the composition according to the embodiment 3, wherein the catalyst comprises at least one selected from the group including titanium complex, dibutyltin diacetate, (tetramethylguanidino) propyl triethoxy silane, dibutyltin dilaurate, and stannous octoate.

The embodiment 17 is the composition according to any one of preceding the embodiments, wherein the content of the reactive or curable silicone is in the range of 5%-40% by weight, preferably 7%-27% by weight and more preferably 9%-25%, based on the total weight of the composition.

The embodiment 18 is the composition according to any one of preceding the embodiments, wherein the amount of the crosslinker ranges from 0.1% to 25% by weight, preferably from 0.8% to 15% by weight, more preferably from 2% to 10% by weight, based on the amount of the reactive or curable silicone.

The embodiment 19 is the composition according to any one of preceding the embodiments, wherein the content of the unreactive silicone is in the range of 1%-35% by weight and preferably 3%-20% by weight, based on the total weight of the composition.

The embodiment 20 is the composition according to any one of preceding the embodiments, wherein the content of the initial strength-imparting agent and/or the plasticizer is in the range of 1%-40% by weight, preferably 2%-31% by weight and more preferably 2%-25% by weight, based on the total weight of the composition.

The embodiment 21 is the composition according to any one of preceding the embodiments, wherein the amount of the catalyst ranges from 0.5% to 15% by weight, preferably from 1% to 8% by weight, and more preferably from 2% to 6% by weight, based on the amount of the reactive or curable silicone.

The embodiment 22 is the composition according to any one of preceding the embodiments, further comprising at least one component selected from the group including a co-crosslinker, a reinforcing agent, an adhesive promoter, a pigment, a toner, a fire retardant, a surface modifier, a thickener, a rheology modifier, and the combination thereof, and preferably, a reinforcing agent, a fire retardant, a toner, and the combination thereof.

The embodiment 23 is the composition according to the embodiment 22, wherein the reinforcing agent comprises at least one selected from the group including finely divided silica, fumed silica, silica aerogel, precipitated silica, diatomaceous earth, metal oxides such as iron oxide, titanium oxide, and aluminum oxide, metal nitrides such as boron nitride and aluminum nitride, metal carbonates such as calcium carbonate, magnesium carbonate and zinc carbonate, asbestos, glass wool, powdered mica, powdered fused silica, and the combination thereof.

The embodiment 24 is the composition according to the embodiment 22, wherein the fire retardant comprises at least one selected from the group including $Al(OH)_3$, $Mg(OH)_2$, halogenated flame retardants, phosphorus flame retardants, nitrogen-based flame retardants and the combination thereof.

The embodiment 25 is the composition according to the embodiment 22, wherein the toner comprises at least one selected from the group including carbon black, iron oxide red, iron oxide black, chromium oxide green, titanium pigment, phthalocyanine and the combination thereof.

The embodiment 26 is the composition according to the embodiment 22, wherein the content of the fire retardant is in the range of 10%-90% by weight, preferably 15%-85% by weight, more preferably 20%-76% by weight and most preferably 29%-71% by weight, based on the total weight of the composition.

The embodiment 27 is the composition according to the embodiment 22, wherein the content of the toner is in the range of 0.1%-5% by weight, preferably 0.5%-2% by weight and more preferably 0.5%-1.5% by weight, based on the total weight of the composition.

The embodiment 28 is the composition according to the embodiment 22, wherein the content of the reinforcing agent may be generally in the range of 0.5%-90% by weight, preferably 1%-85% by weight, more preferably 1%-20% by weight and most preferably 1%-10% by weight, based on the total weight of the composition.

The embodiment 29 is a method of producing the composition according to any one of the embodiments 1 to 28, comprising a step of blending the components of the composition.

The embodiment 30 is the method according to the embodiment 30, wherein the blending step is performed under vacuum.

The embodiment 31 is an article produced from the composition according to any one of the embodiments 1 to 28.

The embodiment 3 is the article according to the embodiment 31, which is in a shape of pad, plate, film, rod, tape, paste or plasticine.

The embodiment 33 is the article according to the embodiment 31 or 32, wherein the article is produced by subjecting the composition according to any one of the embodiments 1 to 28 to extruding and/or calendering.

The embodiment 34 is the article according to any one of the embodiments 31 to 33, wherein the article is self-fusible.

The embodiment 35 is a device comprising the composition according to any one of the embodiments 1 to 28 or the article according to any one of the embodiments 31 to 34 which has been subjected to the curing.

The embodiment 36 is the device according to the embodiment 35, wherein the device is selected from the group including electrical devices, electronic devices, semiconductor devices, and medical devices.

The embodiment 37 is a method of using the article according to any one of the embodiments 31 to 34 comprising a step of applying the article onto a surface of a substrate and a step of curing the article by exposing it to moisture.

The embodiment 38 is the method according to the embodiment 37, wherein the substrate is made from at least one material selected from the group including stainless steel, polyvinylchloride (PVC), polyethylene (PE) and the combination thereof.

The embodiment 38 is the method according to the embodiment 37, wherein the substrate is a connector/cable assembly, and the article is in the form of a pad.

The embodiment 40 is the method according to the embodiment 39, wherein the pad is pressed onto the surface of the connector/cable assembly by an installation clip.

The embodiment 41 is the method according to the embodiment 39, wherein the installation clip comprises an outer shelter and an annular inner foam, said outer shelter comprising an annular shelter portion and a gripping portion, said annular shelter portion having inner and outer wall surfaces and two ends and comprising shorter pressing teeth provided along the inner wall surface at one end and longer pressing teeth provided along the inner wall surface at the other end, said gripping portion being integrated onto the outer wall surface of the annular shelter portion and comprising a pair of opposite install teeth capable of being engaged with each other, said annular inner foam being disposed insider the annular shelter portion of the outer shelter and comprising concentric outer and inner layers which are separated via an annular space and connected to each other by ribs.

The embodiment 42 is the method according to the embodiment 41, wherein the pair of opposite install teeth are indented at the opposite side surfaces thereof.

The embodiment 43 is the method according to the embodiment 41, wherein the pair of opposite install teeth are smooth at the opposite side surfaces thereof.

The embodiment 44 is the method according to the embodiment 41, wherein the annular inner foam is made from at least one material selected from the group including polyurethane rubber, siloxane rubber and the combination thereof.

The embodiment 45 is the method according to the embodiment 41, wherein the outer shelter is made from plastics and preferably nylon 66.

Without further description, it is believed that one of ordinary skill in the art can, by using the preceding description and the above illustrative examples, make and utilize the compositions of the present invention and practice the claimed methods.

Although certain presently preferred embodiments of the invention have been specifically described herein, it will be apparent to those skilled in the art to which the invention pertains that variations and modifications of the various embodiments shown and described herein may be made without departing from the spirit and scope of the invention. Accordingly, it is intended that the invention be limited only to the extent required by the appended claims and the applicable rules of law.

The invention claimed is:

1. A moisture curable composition, comprising:
   a reactive or curable silicone;
   a crosslinker;
   an unreactive silicone, wherein the unreactive silicone is a high molecular weight solid silicone rubber;
   an initial strength-imparting agent, wherein the initial strength-imparting agent comprises at least one uncrosslinked or partially crosslinked rubber selected from the group consisting of butyl rubber, fluoroelastomer (FKM), hydrogenated nitrile rubber (HNBR), and ethylene propylene diene rubber (EPDM); and
   a plasticizer, wherein the plasticizer is liquid polyisobutene.

2. The composition according to claim 1, wherein the ratio of the reactive or curable silicone to the unreactive silicone is in the range of 1:10 to 40:1 by weight.

3. The composition according to claim 1, further comprising a catalyst, wherein the catalyst is selected from the group consisting of titanium complex, dibutyltin diacetate, (tetramethylguanidino) propyl triethoxy silane, dibutyltin dilaurate, and stannous octoate.

4. The composition according to claim 3, wherein the amount of the catalyst ranges from 0.5% to 15% by weight, based on the amount of the reactive or curable silicone.

5. The composition according to claim 1, wherein the content of the reactive or curable silicone is in the range of 5%-40% by weight, based on the total weight of the composition, and wherein the reactive or curable silicone is selected from the group consisting of a hydroxyl-containing silicone resin, an alkoxyl-containing silicone resin, and combinations thereof.

6. The composition according to claim 1, wherein the content of the unreactive silicone is in the range of 1%-35% by weight, based on the total weight of the composition.

7. The composition according to claim 1, wherein the high molecular weight solid silicone rubber is selected from the group consisting of polydimethylsiloxane silicone rubber, polymethylvinylsilicone rubber, polymethylphenylsilicone rubber and combinations thereof.

8. The composition according to claim 1, wherein the crosslinker is selected from the group consisting of methyltriacetoxysilane, methyltrimethoxysilane, methyl tri(isopropenyloxy) silane, methyltrimethylethylketoximesilane, vinyltrimethoxysilane, vinyltriethoxysilane, γ-(methacryloxy)propyltrimethoxysilane, aminopropyltriethoxysilane, N-(β-aminoethyl)-γ-aminopropyltrimethoxysilane, γ-(2,3-epoxypropoxy)propyltrimethoxysilane,γ-mercaptopropyltriethoxysilane, γ-mercaptopropyltrimethoxysilane, methyltriethoxysilane, tetramethoxysilane, tetrapropoxysilane, tetraethoxysilane, and ethyltriacetoxysilane.

9. The composition according to claim 1, wherein the amount of the crosslinker ranges from 0.1% to 25% by weight, based on the amount of the reactive or curable silicone.

10. The composition according to claim 1, wherein the content of the initial strength-imparting agent and/or the plasticizer is in the range of 1%-40% by weight, based on the total weight of the composition.

11. The composition according to claim 1, further comprising a reinforcing agent selected from the group consisting of finely divided silica, fumed silica, silica aerogel, precipitated silica, diatomaceous earth, iron oxide, titanium oxide, aluminum oxide, boron nitride, aluminum nitride, calcium carbonate, magnesium carbonate, zinc carbonate, asbestos, glass wool, powdered mica, powdered fused silica, and combinations thereof, wherein the content of the reinforcing agent may be generally in the range of 0.5%-90% by weight, based on the total weight of the composition.

12. The composition according to claim 1, further comprising a fire retardant selected from the group consisting of Al(OH)$_3$, Mg(OH)$_2$, halogenated flame retardants, phosphorus flame retardants, nitrogen-based flame retardants and combinations thereof, wherein the content of the fire retardant is in the range of 15%-85% by weight based on the total weight of the composition.

13. The composition according to claim 1, further comprising a toner selected from the group consisting of carbon black, iron oxide red, iron oxide black, chromium oxide green, titanium pigment, phthalocyanine and combinations thereof, wherein the content of the toner is in the range of 0.1%-5% by weight, based on the total weight of the composition.

14. An article produced from the composition according to claim 1, wherein the article is in a shape of pad, plate, film, rod, tape, paste or plasticine.

15. The article according to claim 14, wherein the article is self-fusible.

16. A method of using a self-fusible article, comprising:
providing the article having a shape of pad, plate, film, rod, tape, paste or plasticine produced from a moisture curable composition, comprising a reactive or curable silicone, a crosslinker, an unreactive silicone; and at least one of an initial strength-imparting agent and a plasticizer, wherein the article is self-fusible;
applying the article onto a surface of a connector/cable assembly and
curing the article by exposing it to moisture.

17. The method according to claim 16, wherein the article is in the form of a pad, and the pad is pressed onto the surface of the connector/cable assembly by an installation clip comprising an outer shelter and an annular inner foam, wherein said outer shelter comprises an annular shelter portion and a gripping portion, said annular shelter portion having inner and outer wall surfaces and two ends and comprising shorter pressing teeth provided along the inner wall surface at one end and longer pressing teeth provided along the inner wall surface at the other end, said gripping portion being integrated onto the outer wall surface of the annular shelter portion and comprising a pair of opposite install teeth capable of being engaged with each other, and wherein said annular inner foam is disposed insider the annular shelter portion of the outer shelter and comprises concentric outer and inner layers which are separated via an annular space and connected to each other by ribs.

* * * * *

UNITED STATES PATENT AND TRADEMARK OFFICE
CERTIFICATE OF CORRECTION

PATENT NO. : 10,259,910 B2
APPLICATION NO. : 15/542102
DATED : April 16, 2019
INVENTOR(S) : Yaming Wang Page 1 of 1

It is certified that error appears in the above-identified patent and that said Letters Patent is hereby corrected as shown below:

On the Title Page

Item (71), APPLICANTS, delete "Yaming Wang, Shanghai (CN)"

In the Specification

Column 4,
Line 44, delete "corsslinking" and insert -- crosslinking -- therefor.

Column 7,
Line 15, delete "iron 2-ethylhexoate" and insert -- iron 2-ethylhexanoate -- therefor.
Line 15, delete "cobalt 2-ethylhexoate" and insert -- cobalt 2-ethylhexanoate -- therefor.
Line 16, delete "2-ethylhexoate" and insert -- 2-ethylhexanoate -- therefor.

Column 8,
Line 50, delete "calendaring" and insert -- calendering -- therefor.
Line 53, delete "calendaring" and insert -- calendering -- therefor.

Column 14,
Line 7, delete "+3 mm" and insert -- ±3 mm -- therefor.

Column 15,
Line 46, delete "85+5%" and insert -- 85±5% -- therefor.

Signed and Sealed this
Tenth Day of December, 2019

Andrei Iancu
*Director of the United States Patent and Trademark Office*